(12) United States Patent
Pett

(10) Patent No.: US 6,314,181 B1
(45) Date of Patent: Nov. 6, 2001

(54) BRIDGED TAP CANCELLER

(75) Inventor: Todd A. Pett, Longmont, CO (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 09/513,948

(22) Filed: Feb. 28, 2000

Related U.S. Application Data

(63) Continuation-in-part of application No. 09/221,043, filed on Nov. 30, 1998.

(51) Int. Cl.[7] .............................. H04M 7/04; H04M 9/00
(52) U.S. Cl. ........................ 379/398; 379/394; 379/93.05; 370/494
(58) Field of Search ......................... 379/398, 394, 379/399.01, 413.02, 93.08, 93.01, 93.05, 93.11, 93.16, 93.15, 110.01, 400, 402, 405; 370/468, 524, 535, 494, 493, 497

(56) References Cited

U.S. PATENT DOCUMENTS

| | | |
|---|---|---|
| 5,610,922 | 3/1997 | Balatoni . |
| 5,729,824 | 3/1998 | O'Neill et al. . |
| 5,757,803 | 5/1998 | Russell et al. . |
| 5,883,941 | 3/1999 | Akers . |
| 5,970,088 | 10/1999 | Chen . |
| 6,002,722 | 12/1999 | Wu . |
| 6,021,167 | 2/2000 | Wu . |
| 6,031,300 | 2/2000 | Moran . |
| 6,240,178 | * 5/2001 | Pett et al. .............................. 379/398 |

* cited by examiner

Primary Examiner—Wing F. Chan
(74) Attorney, Agent, or Firm—Brooks & Kushman P.C.

(57) ABSTRACT

Subscriber loop systems often contain bridged taps which may interfere with the transmission of DSL signals. The bridged tap creates at least one local minimum at a notch frequency in the frequency response of the subscriber loop within the frequency range of the DSL signals. Effects of the bridged tap on a subscriber loop are reduced by terminating the bridged tap with a bridged tap canceller. The bridged tap canceller has at least one filter element for each local minimum created by the bridged tap. Each filter element provides substantially complete reflection of DSL signals at the corresponding notch frequency.

20 Claims, 3 Drawing Sheets

BRIDGED TAP CANCELLER

CROSS-REFERENCE TO RELATED APPLICATION

This application is a continuation-in-part of copending U.S. patent application Ser. No. 09/201,043 filed Nov. 30, 1998, titled "Bridged Tap Terminator," the specification of which is expressly incorporated herein by reference in its entirety.

TECHNICAL FIELD

The present invention relates to terminating bridged taps on a subscriber loop used to carry digital subscriber line signals.

BACKGROUND ART

A subscriber loop connects a telephone company central office to a demarcation point on customer premises. The subscriber loop is typically a pair of wires such as a twisted pair. Traditionally, a subscriber loop is used to carry plain old telephone service (POTS) signals between central office equipment and customer equipment.

Bridged taps are sometimes introduced into the subscriber loop. Bridged taps are typically wire splices on a cable pair. Bridged taps simplify outside plant design and administration by making a wire pair physically available for termination at different customer locations. Although only one customer typically uses the cable pair at any time, the bridged tap provides flexibility as to which particular customer is assigned to any particular cable pair. This flexibility simplifies network design that results from frequent customer moves, requests for second lines, and new constructions. Often, a bridged tap is left unterminated once installed in the subscriber loop.

Recently, services based on digital subscriber lines (DSLs) have been provided to customers over subscriber loops. DSL signals operate at a higher bandwidth than POTS signals, permitting increased access to voice, data, and video services. Also, DSL signals may be modulated to a frequency range outside the range covered by POTS signals.

Bridged taps in subscriber loops may severely attenuate DSL signals. This is because the unterminated bridged tap appears as a low impedance element over certain frequency ranges depending, in part, on the geometry of the bridged tap. If DSL signals are operating within these frequency ranges, the signals may be severely attenuated. Previous efforts to terminate bridged taps reduce the effects of notches or dips in the spectrum due to the bridged tap but result in an overall attenuation of the DSL spectrum.

What is needed is proper termination of bridged taps to allow adequate transmission of DSL signals without significant signal loss. The termination should cancel the effects of the bridged tap. Bridged tap cancellation should be adaptable to different tap geometries and subscriber loop variations as well as be economical to produce.

DISCLOSURE OF INVENTION

It is a primary object of the present invention to provide termination of bridged taps in communication lines.

Another object of the present invention is to improve DSL reception on a subscriber loop.

Still another object of the present invention is to provide bridged tap cancellation without significant loss of signal strength.

Yet another object of the present invention is to provide bridged tap cancellation without adversely affecting POTS transmission.

A further object of the present invention is to provide bridged tap cancellation that is economical to produce.

In carrying out the above objects and other objects and features of the present invention, a method is provided for improving reception on a subscriber loop used to carry digital subscriber line (DSL) signals. The subscriber loop contains a bridged tap creating at least one local minimum at a notch frequency in the frequency response of the subscriber loop within the frequency range of the DSL signals. Coefficients are determined for a terminating filter. The terminating filter has at least one filter element for each local minimum created by the bridged tap in the DSL signal range. Each filter element provides substantially complete reflection of DSL signals at the corresponding notch frequency. The terminating filter is constructed based on the determined coefficients. The bridged tap is then terminated with the constructed terminating filter.

In various embodiments of the present invention, determining coefficients comprises selecting band pass filter coefficients such that the resulting band pass filter has a bandwidth substantially the same as the corresponding local minimum, selecting low pass filter coefficients such that the resulting low pass filter has a bandwidth including at least one local minimum, and selecting high pass filter coefficients such that the resulting high pass filter has a bandwidth including at least one local minimum. The terminating filter also includes a terminating load impedance.

A termination for a subscriber loop bridged tap is also provided. The termination includes a band pass filter connected to the bridged tap for each local minimum. The band pass filter passes frequencies including a notch frequency at which the corresponding local minimum occurs. A load impedance is connected to the band pass filter.

A subscriber loop system is also provided. The subscriber loop system includes a central office having service provider POTS communication equipment. Service provider DSL communication equipment is also provided. Customer premises, including customer POTS communication equipment and customer DSL communication equipment, are joined through subscriber loops connecting customer POTS communication equipment with corresponding provider POTS communication equipment and connecting customer DSL equipment with corresponding provider DSL equipment. At least one subscriber loop has a bridged tap that would otherwise cause the subscriber loop to have a frequency response with at least one local minimum within the frequency range of DSL signals. A bridged tap canceller connected to the bridged tap cancels the effects of the local minima. The bridged tap canceller has a terminating filter with a filter element for each local minimum created by the bridged tap. Each filter element provides substantially complete reflection of DSL signals at a notch frequency corresponding to the local minimum.

In an embodiment, each filter element minimizes loading within the POTS band. This may be accomplished by using a cutoff frequency above the frequency range of the POTS signals in each filter element.

The above objects and other objects, features, and advantages of the present invention are readily apparent from the following detailed description of the best modes for carrying out the invention when taken in connection with accompanying drawings.

BEST MODE FOR CARRYING OUT THE INVENTION

Figure 1:
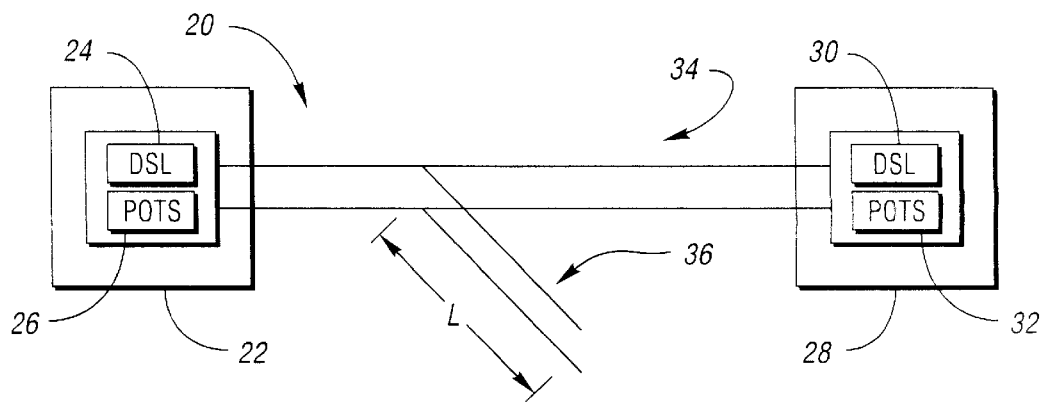
FIG. 1 is a schematic drawing of a subscriber loop having a bridged tap.

Referring now to FIG. 1, a schematic drawing of a subscriber loop having a bridged tap is shown. A subscriber loop system, shown generally by 20, includes central office 22 having service provider DSL communication equipment 24 capable of transmitting and receiving DSL signals and service provider POTS equipment 26 capable of transmitting and receiving POTS signals. DSL signals may include one or more of asymmetrical DSL (ADSL), very high speed DSL (VDSL), and the like. DSL service provider equipment need not reside in central office 22. For example, DSL provider equipment may reside in an optical network unit (ONU) upstream of central office 22. At least one customer premises 28 includes customer DSL communication equipment 30 and customer POTS communication equipment 32. A subscriber loop, shown generally by 34, connects customer premises equipment 28 with communication equipment 24 in central office 22. Typically, subscriber loop 34 uses twisted pair cabling.

Subscriber loop 34 includes at least one bridged tap, shown generally by 36. Bridged tap 36 generally consists of a section of twisted pair transmission line which is connected in shunt with active subscriber loop 34. Bridged tap 36 simplifies outside plant design and administration by making subscriber loop 34 physically available for termination at different customer locations. Bridged tap 36 has length, L, which is typically the length of the twisted pair section spliced onto subscriber loop 34.

Figure 2:
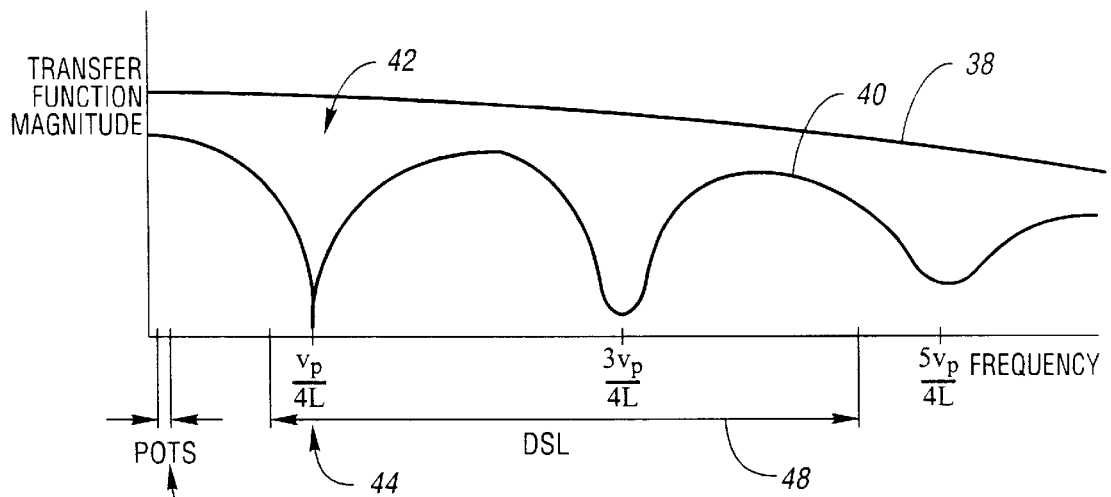
FIG. 2 is a graph of the magnitude of a transfer function for the subscriber loop of FIG. 1.

Referring now to FIG. 2, a graph of the magnitude of a transfer function for the subscriber loop of FIG. 1 is shown. Curve 38 illustrates the magnitude transfer function for subscriber loop 34 without bridged tap 36. Curve 40 illustrates the magnitude transfer function for subscriber loop 34 with bridged tap 36. A first difference between curves 38 and 40 is a decrease in signal strength of about 5 to 7 dB. A second difference is the appearance of local minima in curve 40.

The net effect of bridged tap loading is lower signal power at the receiver, which reduces the signal-to-noise ratio (SNR). SNR determines the signal quality, which may be expressed as the bit error ratio (BER) of the received signal. For DSL, the SNR determines the loop length or reach for a given service rate and BER requirement. Conversely, the SNR determines the service rate possible for a given loop length and configuration.

Local minima in curve 40, one of which is indicated by 42, occur at notch frequencies, one of which is indicated by 44. Notch frequencies 44 occur at frequencies which are a function of the length L and the velocity of propagation, $V_p$. The velocity of propagation is determined by transmission line type and geometry and can vary from nearly the speed of light for parallel conductor lines with wide separation to approximately 60 percent of the speed of light for gel-filled twisted pair exchange cables. Specifically, notch frequencies 44 occur when the bridged tap length is an odd multiple of a quarter wavelength $\lambda/4$ as in Equation 1:

$$L = (2n+1)\frac{\lambda}{4} \quad \text{where} \quad n = 0, 1, 2, \ldots \quad (1)$$

Notch frequencies 44, the frequencies at which local minima 42 occur, can be expressed by Equation 2:

$$f_{minima} = (2n+1)\frac{v_P}{4L} \quad (2)$$

For polyethylene insulated conductors (PIC), Equation 2 simplifies to Equation 3:

$$f_{minima} \cong (2n+1)\frac{50}{L} \quad (3)$$

where the notch frequency $f_{minima}$ is in MHz and the tap length, L, is in meters.

The frequency range spanned by POTS signals, shown generally by 46, is typically well below the first minimum 42. Hence, local minima 42 due to bridged tap 36 do not have a significant effect on POTS signals. The frequency range spanned by DSL signals, shown generally by 48, may occur at much higher frequencies than POTS frequency range 46. DSL signals may suffer severe attenuation if DSL frequency range 48 includes one or more minimum 42. By properly terminating bridged tap 36, both POTS signals and DSL signals may be transmitted through subscriber loop 34 without excessive attenuation.

Bridge tap terminators have been proposed which mitigate the loading effect of bridged tap 36. These devices are generally made of passive circuits connected to the open end of bridged tap 36. These device are designed to match the characteristic impedance of bridged tap 36, thereby minimizing signal reflections over the frequency band of interest. While this technique reduces or eliminates local minima 42, the matched load dissipates half of the signal power incident at the bridged tap attachment junction. In addition, 0.5 dB power is lost due to reflection at the bridged tap. Hence, approximately 3.5 dB less signal power is available to the receiver.

Figure 3:
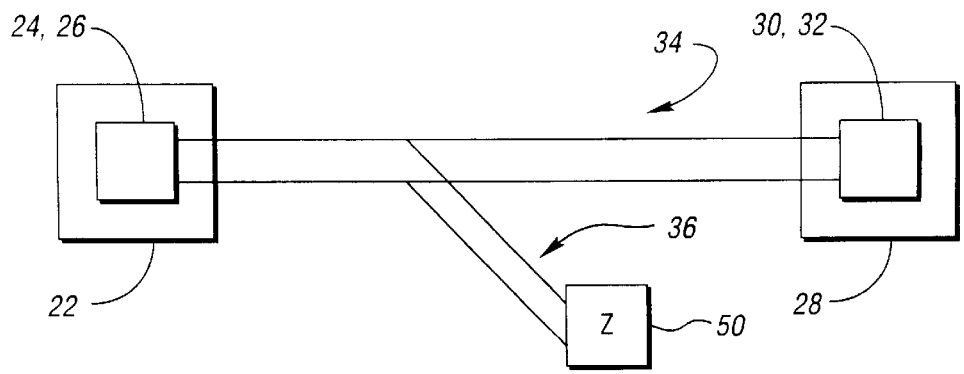
FIG. 3 is a schematic diagram of a subscriber loop having a bridged tap canceller according to the present invention.

Referring now to FIG. 3, a schematic diagram of a subscriber loop having a bridged tap canceller according to the present invention is shown. The reception on subscriber loop 34 carrying POTS signals and DSL signals can be improved by first determining coefficients for a terminating filter. The terminating filter has at least one filter element for each local minimum 42 created by bridged tap 36. Each filter element provides substantially complete reflection of DSL signals at the corresponding notch frequency 44. Determining terminating filter coefficients may include selecting a filter type, order, and configuration. The terminating filter is constructed based on the determined coefficients. Bridged tap 36 is terminated with the constructed filter. The terminating filter, shown as 50, is known as a bridged tap canceller.

Figure 4:
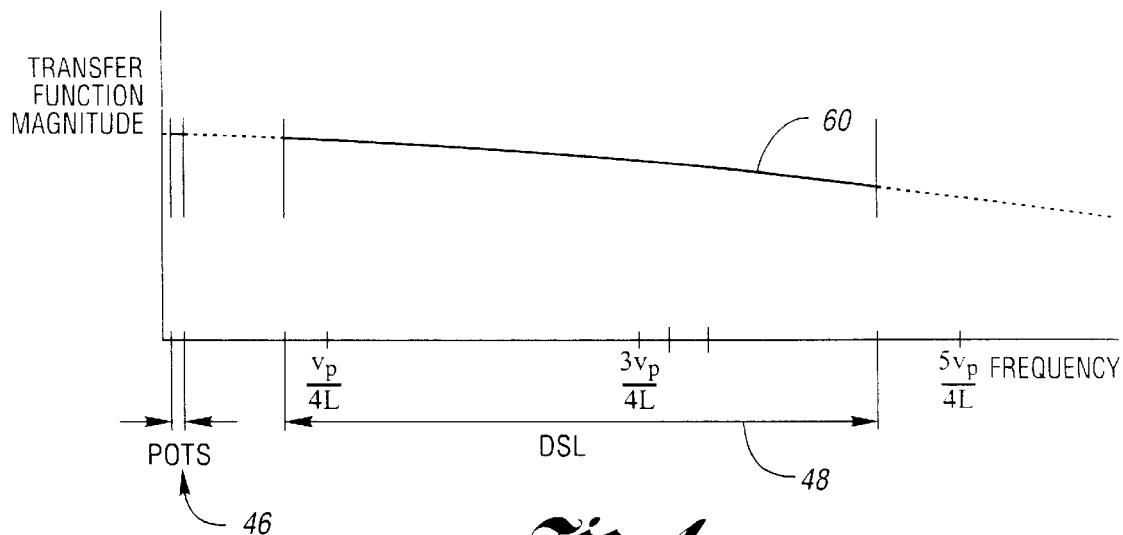
FIG. 4 is a graph of the magnitude of a transfer function for a bridged tap canceled subscriber loop according to an embodiment of the present invention.

Referring now to FIG. 4, a graph of the magnitude of a transfer function for a bridged tap canceled subscriber loop according to an embodiment of the present invention is shown. Curve 60 indicates a desirable magnitude transfer function for subscriber loop 34 with bridged tap 36 and bridged tap canceller 50. Preferably, curve 60 exhibits no local minima 42 over POTS frequency range 46 and DSL frequency range 48. The dashed regions in curve 60 indicate frequency ranges over which no signals are transmitted and, hence, attenuation levels are not critical.

Figure 5:
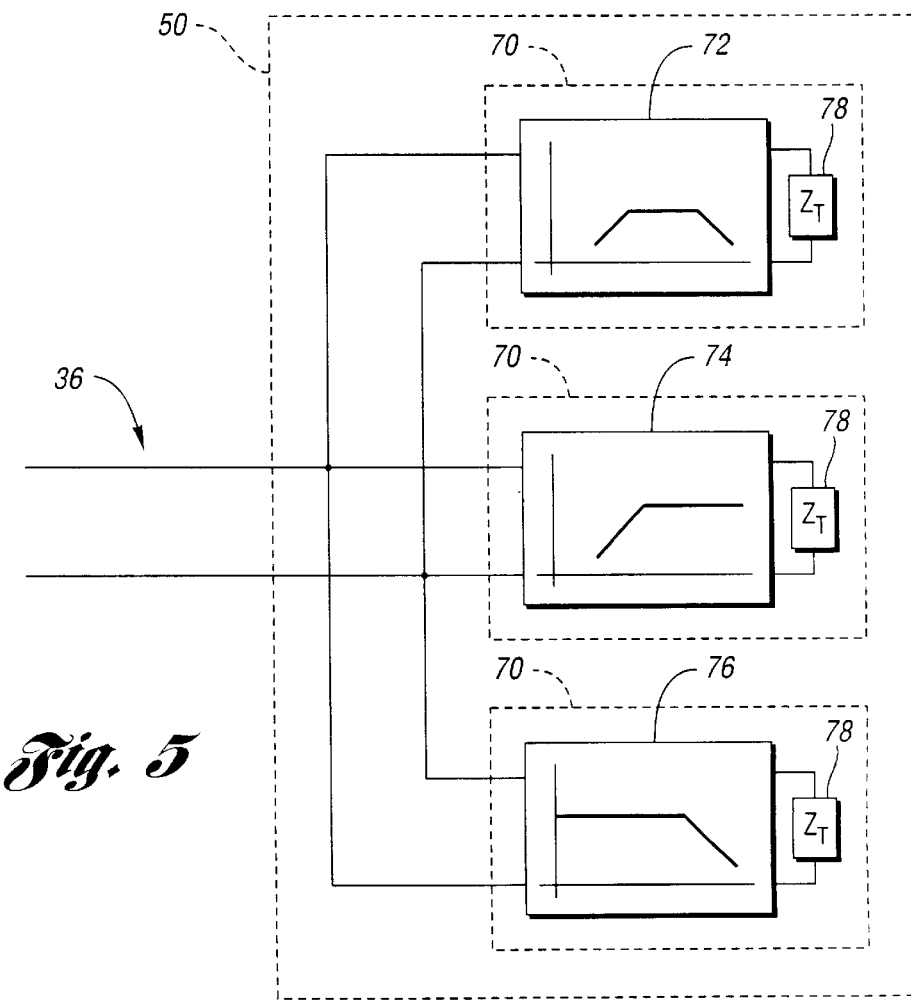
FIG. 5 is a drawing of a bridged tap canceller according to an embodiment of the present invention.

Referring now to FIG. 5, a drawing of a bridged tap canceller according to an embodiment of the present invention is shown. Bridged tap 36 is terminated with bridged tap canceller 50 having at least one filter element 70 for each local minimum 42 within DSL frequency range 48. Each filter element 70 may include band pass filter 72, high pass filter 74, or low pass filter 76 connected across bridged tap 36. Each filter element also includes terminating impedance 78, shown as $Z_T$, following filter 72, 74, 76. The pass band of filter element 70 may span more than one notch frequency 44. Also, each notch frequency 44 may be spanned by the pass band of more than one filter element 70. Each filter element 70 may be a passive circuit or an active circuit.

Filter element 70 provides substantially complete reflection of DSL signals at notch frequency 44 corresponding to local minimum 42 spanned by the pass band of filter element 70. Filter element 70 also minimizes the loading effect of terminated bridged tap 36 around notch frequency 44 without degrading the frequency response of subscriber loop system 20 outside of local minimum 42. This permits bridged tap canceller 50 to supply a frequency dependent impedance which enables the cancellation of local minima 42, creating the appearance that bridged tap 36 has been disconnected from subscriber loop system 20.

The loading effect of terminated bridged tap 36 on subscriber loop system 20 may be expressed as the well known terminated transmission line equation reproduced as Equation 4:

$$Z_{IN} = Z_C Z_L + \frac{Z_C \tanh(j\beta l + \alpha l)}{Z_C + Z_L \tanh(j\beta l + \alpha l)} \, \Omega \quad (4)$$

where $Z_{IN}$ is the impedance of bridged tap 36 as seen by subscriber loop system 20, $Z_C$ is the impedance of bridged tap 36 of length l, $Z_L$ is the impedance of bridged tap canceller 50, and $\gamma = \alpha + j\beta$ is the propagation constant for bridged tap 36 with $\alpha$ representing the attenuation constant and $\beta$ representing the phase constant. Ideally, bridged tap canceller 50 is designed such that bridged tap 36 terminated by bridged tap canceller 50 appears like an open circuit to the remainder of subscriber loop system 20. This may be accomplished by constructing bridged tap canceller 50 with an impedance satisfying Equation 5 at the notch frequencies:

$$Z_L = \frac{-Z_C}{\tanh(j\beta l + \alpha l)} \, \Omega \quad (5)$$

An approximate solution uses one or more filter elements 70 designed to have the inverse response of local minimum 42 around notch frequency 44 while not adversely affecting the regions of spectrum 40 away from local minimum 42.

Figure 6:
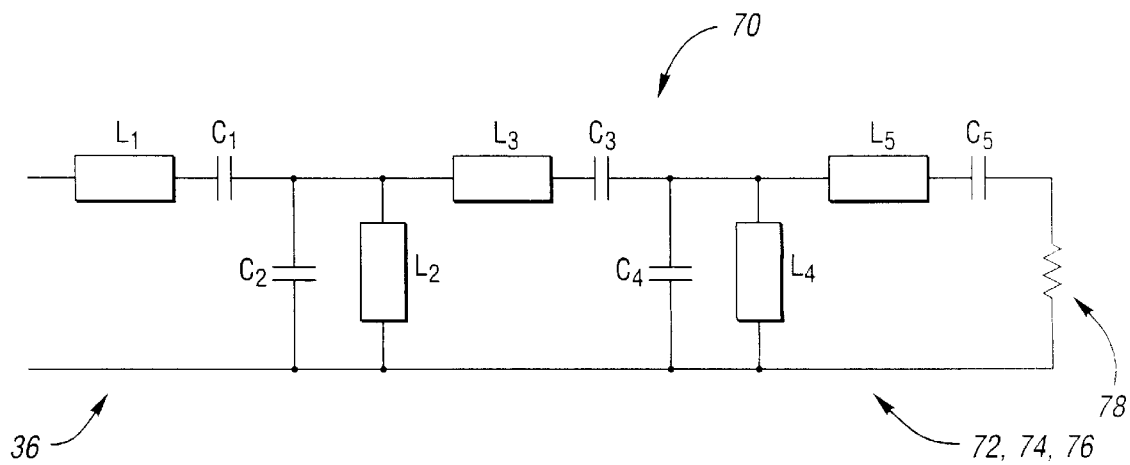
FIG. 6 is a circuit diagram illustrating an implementation of a filter element according to an embodiment of the present invention.

Referring now to FIG. 6, a circuit diagram illustrating an implementation of a filter element according to an embodiment of the present invention is shown. Filter element 70 includes filter 72, 74, 76 made from passive components and resistor $R_L$ as terminating impedance 78. In one embodiment of the present invention, filter element 70 functions as a band pass filter having a bandwidth approximately the same as the width of local minimum 42. Selecting component values to implement, for example, a Butterworth band pass filter 72 is well known in the electronic arts.

Figure 7:
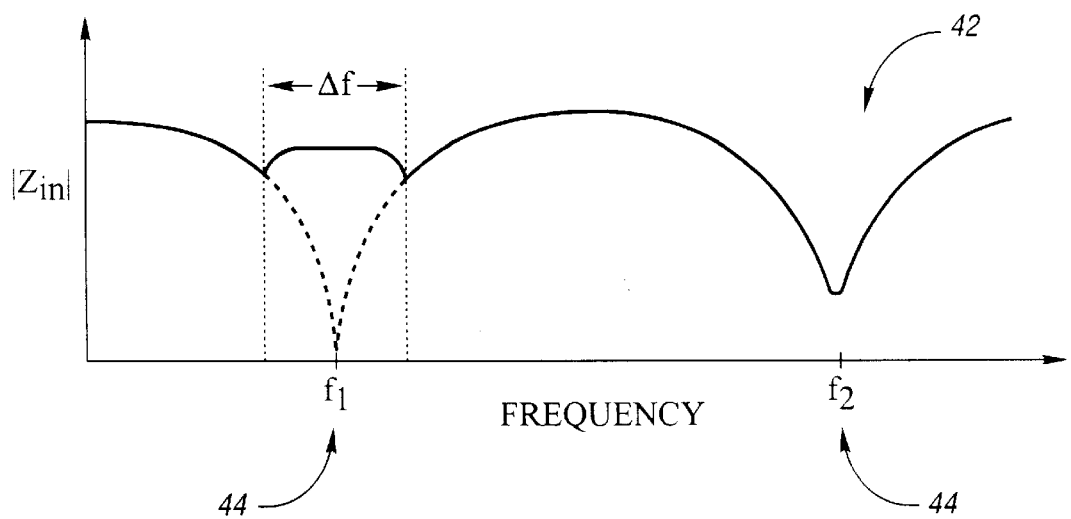
FIG. 7 is a graph of the magnitude of a transfer function for a subscriber loop system including a bridged tap canceller according to an embodiment of the present invention.

Referring now to FIG. 7, a graph of the magnitude of a transfer function for a subscriber loop system including a bridged tap canceller according to an embodiment of the present invention is shown. Local minimum 42 at notch frequency 44, indicated by $f_1$, has been reduced by attaching bridged tap canceller 50 to bridged tap 36. Bridged tap canceller 50 in this example has a single bandpass filter element 70. Hence, only local minimum 42 at $f_1$ has been corrected. An additional filter element 70 in bridged tap canceller 50 is necessary to compensate for local minimum 42 at another notch frequency 44, indicated by $f_2$.

An alternative method to minimize the impact of bridged tap 36 entails connecting an active bridged tap canceller 50 producing a frequency dependent phase shift such that the impedance of bridged tap 36 with canceller 50 remains high across the frequency band of interest. The impedance Z(l) at any point l along a transmission line can be expressed in terms of the voltage reflection coefficient Γ(l) as Equation 6:

$$Z(l) = Z_C 1 + \frac{\Gamma(l)}{1 - \Gamma(l)} \quad (6)$$

At an open circuit, Γ(l)=1 and the impedance is infinite. If the reflection coefficient is known at some location l, the reflection coefficient at some other location l' is expressed by Equation 7:

$$\Gamma(l') = \Gamma(l) e^{2\gamma(l'-l)} \quad (7)$$

If l' is the end of bridged tap 36 to which canceller 50 is attached and l is the end of bridged tap 36 connected to the remainder of subscriber loop system 20, then Γ(l') must be one. This condition can only be satisfied if $e^{2\gamma(l'-l)} = 1$, which implies that the phase component $2j\beta(l'-l)=0$. Hence, the propagation phase delay along bridged tap 36 must be offset by the phase advance introduced by bridged tap canceller 50. Since the length of bridged tap 36 can be measured and $\beta$ is determined by the signal frequency and transmission line type, the phase advance function required for active termination can be easily derived.

In an embodiment of the present invention, filter element 70 minimizes loading within POTS band 46. This may be accomplished by using a cutoff frequency for filter 72 above POTS frequency range 46.

While embodiments of the invention have been illustrated and described, it is not intended that these embodiments illustrate and describe all possible forms of the invention. Rather, it is intended that the following claims cover all modifications and alternative designs, and all equivalents, that fall within the spirit and scope of this invention.

What is claimed is:

1. A method for improving reception on a subscriber loop used to carry digital subscriber line (DSL) signals, the subscriber loop containing a bridged tap, the bridged tap creating at least one local minimum at a notch frequency in the frequency response of the subscriber loop within the frequency range of the DSL signals, the method comprising:

determining coefficients for a terminating filter, the terminating filter comprising at least one filter element for each local minimum created by the bridged tap, each filter element providing substantially complete reflection of DSL signals at the corresponding notch frequency;

constructing the terminating filter based on the determined coefficients; and terminating the bridged tap with the constructed terminating filter.

2. A method for improving reception as in claim 1 wherein determining coefficients comprises selecting band pass filter coefficients, the resulting band pass filter having a bandwidth substantially the same as the corresponding local minimum.

3. A method for improving reception as in claim 1 wherein determining coefficients comprises selecting high pass filter coefficients, the resulting high pass filter having a bandwidth including at least one local minimum.

4. A method for improving reception as in claim 1 wherein determining coefficients comprises selecting low pass filter coefficients, the resulting low pass filter having a bandwidth including at least one local minimum.

5. A method for improving reception as in claim 1 wherein the terminating filter comprises a load impedance.

6. A method for improving reception as in claim 1, the frequency response of the subscriber loop including a plurality of local minima within the frequency range of the DSL signals, wherein each filter element corresponding to one of the local minima is connected to the bridged tap open end.

7. A method for improving reception as in claim 1, the subscriber loop further carrying low frequency telephone signals, wherein determining coefficients for a terminating filter further comprises determining a low cutoff frequency for each filter element to be above the frequency range of the telephone signals.

8. A method for improving reception as in claim 1 wherein the subscriber loop comprises twisted pair cabling.

9. A termination for a subscriber loop bridged tap, the subscriber loop used to carry digital subscriber line (DSL) signals, the subscriber loop with the bridged tap having a frequency transfer spectrum with at least one local minimum within the frequency range of the DSL signals, the bridged tap termination comprising:

a band pass filter connected to the bridged tap for each local minimum, the band pass filter passing frequencies including a notch frequency at which occurs the corresponding local minimum; and a load impedance connected to the band pass filter.

10. A termination for a subscriber loop bridged tap as in claim 9 wherein each band pass filter and load impedance combination is operative to provide substantially complete reflection of DSL signals at the corresponding notch frequency.

11. A termination for a subscriber loop bridged tap as in claim 9, the subscriber loop further carrying low frequency telephone signals, wherein each band pass filter has a low cutoff frequency above the frequency range of the telephone signals.

12. A termination for a subscriber loop bridged tap as in claim 9 wherein the subscriber loop comprises twisted pair cabling.

13. A subscriber loop system for carrying plain old telephone service (POTS) signals and digital subscriber line (DSL) signals comprising:

a central office, the central office comprising service provider POTS communication equipment;

service provider DSL communication equipment;

at least one customer premises including customer POTS communication equipment and customer DSL communication equipment;

a subscriber loop connecting customer POTS communication equipment with corresponding provider POTS communication equipment and connecting customer DSL equipment with corresponding provider DSL equipment;

a bridged tap connected to the subscriber loop, the bridged tap causing the subscriber loop to have a frequency response with at least one local minimum within the frequency range of DSL signals; and a bridged tap canceller connected to the bridged tap, the bridged tap canceller comprising a terminating filter with a filter element for each local minimum created by the bridged tap, each filter element providing substantially complete reflection of DSL signals at a notch frequency corresponding to the local minimum.

14. A subscriber loop system as in claim 13 wherein at least one filter element comprises a band pass filter.

15. A subscriber loop system as in claim 13 wherein at least one filter element comprises a high pass filter.

16. A subscriber loop system as in claim 13 wherein at least one filter element comprises a low pass filter.

17. A subscriber loop system as in claim 13 wherein each filter element further comprises a terminating impedance.

18. A subscriber loop system as in claim 13 wherein each filter element has a cutoff frequency above the frequency range of the POTS signals.

19. A subscriber loop system as in claim 13 wherein each filter element minimizes loading withing the POTS band.

20. A subscriber loop system as in claim 13 wherein the subscriber loop comprises twisted pair cabling.

* * * * *